June 7, 1932.  C. C. HOLMES  1,861,474
SIGNAL APPARATUS FOR AUTOMOBILES
Filed April 22, 1930  2 Sheets-Sheet 1
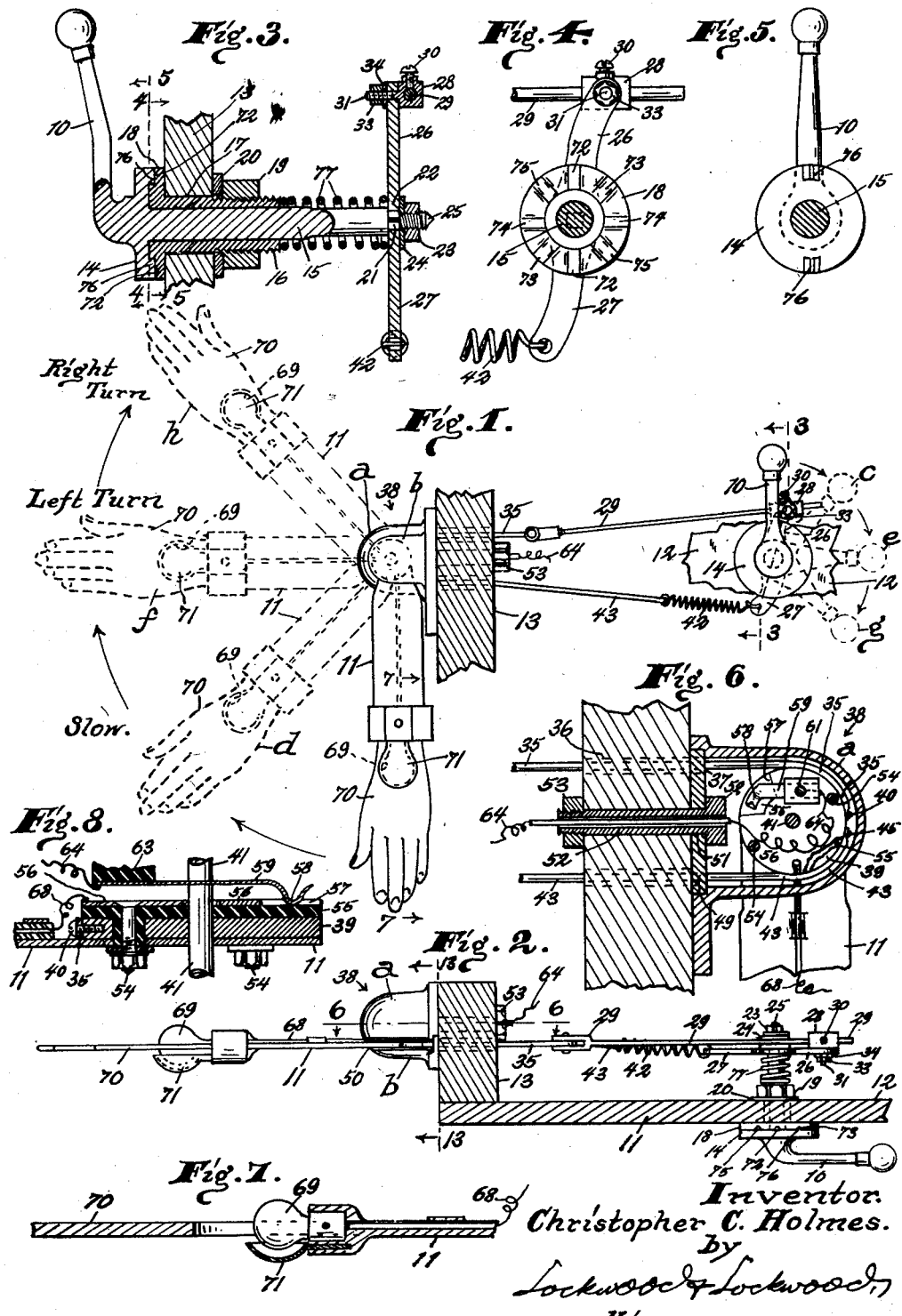
Inventor.
Christopher C. Holmes.
by
Lockwood & Lockwood,
His Attorneys.

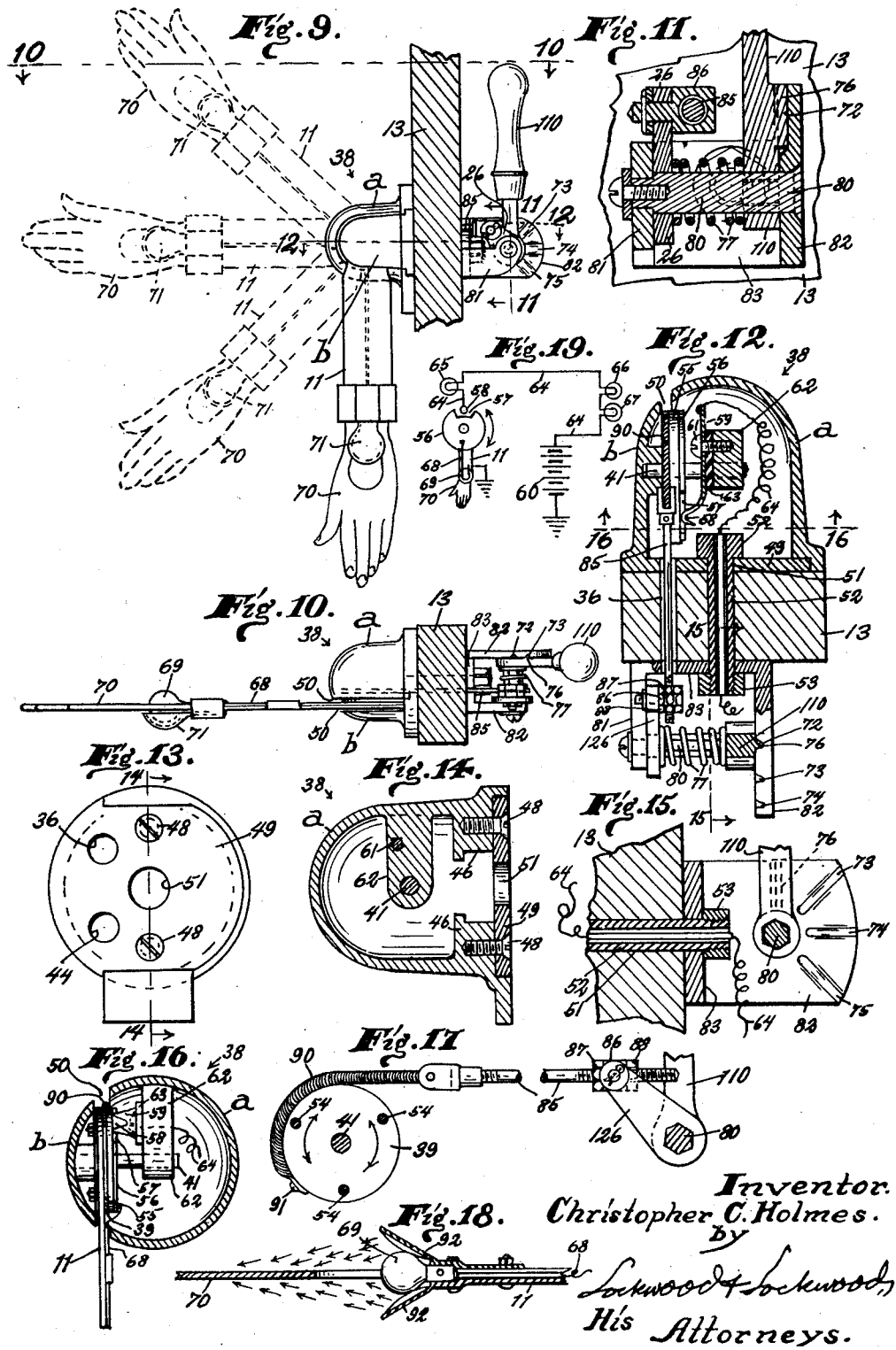

Patented June 7, 1932

1,861,474

UNITED STATES PATENT OFFICE

CHRISTOPHER C. HOLMES, OF LOS ANGELES, CALIFORNIA

SIGNAL APPARATUS FOR AUTOMOBILES

Application filed April 22, 1930. Serial No. 446,260.

This invention relates to a signal apparatus for automobiles and the principal object is to provide an apparatus that is neat and pleasing in appearance, easy to install and operate, durable and effective in operation, and which can be connected to an automobile without greatly mutilating its body and which, when installed, can be easily and effectively operated from the interior of a closed automobile to signal the intentions of the driver relative to turning or stopping the automobile.

An object of the invention is to provide novel and improved apparatus of the class specified which is adapted to indicate beforehand and at a distance fore and aft the automobile driver's intentions to turn right or left or stop by means visible both in light and darkness.

Features of invention are shown in the novel construction, combination and arrangement of parts whereby a signal apparatus is provided that is effective for both day and night service, is simple to construct, manufacture, install and maintain, readily applied to existing automobiles, and that is also easy to operate, convenient to use and effective in use.

Other objects, advantages and features of invention may appear from the accompanying drawings, the subjoined detailed description and the appended claims.

The accompanying drawings illustrate the invention.

Figure 1 is a semidiagrammatic side view of a single apparatus for a closed automobile that is constructed in accordance with this invention showing it attached to a fragmental portion of a dash-board and sectional portion of an automobile side post, also indicating by dotted lines the various positions of the operating lever and signal arms when in use.

Fig. 2 is a plan view of the apparatus with the signal arm moved out to a horizontal position to show a left hand turn, also showing the post and dash-board of an automobile in section.

Fig. 3 is an enlarged fragmental section on staggered line 3—3, Fig. 1, showing a detail of the operating lever and associated parts in an idle position.

Fig. 4 is a cross section on line 4—4, Fig. 3, with the automobile dash-board omitted showing an end view of the stop disk with the stop recesses arranged in its face.

Fig. 5 is a cross section looking in a reverse direction from that shown in Fig. 4 showing the stop disk with its oppositely arranged detents.

Fig. 6 is an enlarged fragmental section on line 6—6, Fig. 2, with the signal arm in normal position, showing the means for connecting the signal arm housing to an automobile frame and also showing the electrical spring contact out of circuit.

Fig. 7 is a fragmental section on line 7—7, Fig. 1, showing the hand lamp and reflector for throwing the light forward from the hand.

Fig. 8 is an enlarged fragmental sectional semidiagrammatic view through the signal arm, pulley and electrical switch showing the contact point of the switch arm engaged with the fiber disk that insulates the contact disk from the pulley and the signal arm.

Fig. 9 is a fragmental sectional view analogous to Fig. 1, showing the apparatus as adapted for use in an open car such as trucks and the like.

Fig. 10 is a cross section on line 10—10, Fig. 9, showing a plan view of the apparatus with the signal arm moved to a horizontal position to indicate a left hand turn.

Fig. 11 is a fragmental section on line 11—11, Fig. 9 showing the means for mounting the control lever.

Fig. 12 is a section on the staggered line 12—12, Fig. 9, showing the signal arm switch partly in section and also showing the means for securing the signal arm switch housing and bracket supporting the control lever to a post of an automobile.

Fig. 13 is a rear view of the signal arm switch housing.

Fig. 14 is a section on line 14—14, Fig. 13, showing a detailed construction of the housing.

Fig. 15 is a fragmental section on line

15—15, Fig. 12, showing a side view of the sector for the control lever.

Fig. 16 is a cross section on line 16—16, Fig. 12, showing an end view of the signal arm switch.

Fig. 17 is a semidiagrammatic side view of the pulley on which the signal arm is mounted and also showing the control levers and connection for rotating it, parts omitted for the sake of clearness in the drawings.

Fig. 18 is a sectional view analogous to Fig. 7 showing a double reflector for throwing the light of the hand lamp out on both the front and rear of the hand.

Fig. 19 is a diagrammatic view of the arm switch and wiring from a battery to the lamp in the signal arm, also showing the lamps in the wiring that can be arranged at the front and rear of the automobile if so desired.

The apparatus includes a hand lever 10 arranged on the inside of a closed car and a signal arm 11 on the outside of a car that are operatively connected so that a driver of the car can signal his intentions to turn right, left or stop.

The lever 10 is preferably mounted on the dash-board 12 of a car, as best indicated in Figs. 1, 2 and 3, so it is in convenient reach of the car driver. Only a fragmental portion of the dash-board and side post 13 of a closed car are shown in the drawings, as the body construction of an automobile is well understood in the art, and it is obvious that the apparatus can be operatively arranged on the body of a car in various places.

The lever 10 is integral with a stop disk 14, from which a slide shank 15 is extended through a sleeve 16 fitted through a hole 17 in the dash-board 12. This sleeve has one of its ends integral with a stationary disk 18 that is drawn securely against the inside wall of the dash-board in a fixed position by a nut 19 forced against a lock washer 20 on the outside of the dash-board, the sleeve having its extended outer end threaded for that purpose.

The shank 15 has its outer end reduced in diameter and provided with a squared portion 21 on which the hub 22 is mounted and secured by a nut 23 and lock washer 24 on the threaded portion 25 of the shank 15, and the hub 22 carries the cranks 26 and 27 arranged oppositely to one another.

The upper crank 26 carries a swiveled bearing 28 through which one end of a draw bar 29 is extended and adjustably secured in the bearing by a set screw 30. Preferably the bearing 28 is pivotally secured in the end of the arm 26 by means of the threaded stem 31, nut 33 and lock washer 34.

The other end of the bar 29 is connected to one end of a flexible link 35 that is extended through an upper hole 36 in the post 13, hole 37 in the base of a hollow semi-spherical split housing 38 and over a pulley 39 to which it is connected by a screw 40, as best indicated in Figs. 6 and 8. The pulley 39 is pivotally mounted on a bearing pin 41 that is secured in the split housing 38. The other crank 27 is connected by a spring 42 to one end of a flexible link 43 that extends through a hole in the post 13 and lower hole 44 in the base of the split housing 38 under the pulley 39 to which it is secured by a pin 45, as indicated in Figs. 1 and 6, so that when the lever 10 is moved in either direction it will move the cranks 26 and 27 to rotate the pulley 39. In other words the shank 15 extends from the inside to the outside of the automobile through the dash board 12 and also some distance beyond the outer end of the sleeve 16 so it can be connected to the signal arm on the outside of the automobile. Also the sleeve and shank are arranged so that no air or rain can enter the closed car around either of them.

The detailed construction of the split housing 38 is best shown in Figs. 1, 12, 13 and 14. It includes the dome-shaped part *a* having an open bottom, and also having two oppositely arranged bosses 46, 47 that are provided with screw holes for the screws 48 by which the base 49 that carries the portion *b* of the dome is secured to the portion *a* in which the base of the signal arm 11 can oscillate.

The base 49 of the housing 38 is provided with a centrally arranged hole 51 through which a hollow bolt 52 is extended for securing the housing to the post 13, the bolt being provided with a nut 53 for that purpose.

The base of the signal arm 11 can be secured to the pulley 39 in any well known way, as by welding or brazing. In Fig. 8 it is shown secured to the pulley by bolts 54 that also hold the fiber and copper disks 55, 56 together on the pin 41.

The copper disk 56 is cut away at 57 so that normally the contact point 58 of the spring switch arm 59 is out of circuit with the battery 50 shown in Fig. 10.

The spring contact arm 59 is secured by a screw 61 to a boss 62 integral with the housing 38, as best shown in Figs. 12, 14 and 16, an insulating block 63 being interposed between the arm and boss.

A wire 64 is in circuit with the contact 58 and it extends out of the housing 38 through the hollow bolt 52 to one side of the battery 60 and in circuit with the wire are the lamps 65, 66 and 67 that can be arranged at the front side and rear of the car, as may be desired, so that when the contact 58 is engaged with the disk 56 the lamps will be lighted, as the disk 56 is connected by a wire 68 with a lamp 69 in the hollow of the hand 70 at the free end of the arm 11 with the circuit through the lamp 69 ground on the arm so that when the circuit is open through contact 58 and disk 56 all the lamps will be lighted; and the lamp 69 in the hand 70 is provided with a reflector 71 to direct the light forward from the rear around the hand so that it is distinctly visible from in front of the car.

The disk 18 is provided with spaced sets of recesses 72, 73, 74 and 75 into which a pair of detents 76 on the disk 14 are forced by a spring 77 when the disk 14 is rotated by the lever 10.

The spring 77 is arranged under tension between the hub 22 and the end of the sleeve 16 so that when the detents are in register with any of the pairs of recesses they will be forced into them to hold the lever 10 in a relatively fixed position until manually released, and also this arrangement of the parts is for the purpose of holding the signal arm 11 in the predetermined positions to indicate a stop, left or right hand turn. From the foregoing it can readily be seen that the shank 15 is both rotatable and slidable in the sleeve 15: rotatable to actuate the signal arm and slidable to engage and disengage the detents on the disk 14 with and from the recesses in the disk 18.

When the lever 10 is moved from the line or neutral position to the dotted position $c$ in Fig. 1 it will also, through its connection to the housing 38, move the arm 11 from the full line or neutral position to the first dotted position $d$ in which positions the detents will enter the set of recesses 73 and hold both the lever 10 and arm 11 in fixed positions until manually moved either back to neutral position or on to the second and third dotted positions $e, f$ and $g, h$.

It is obvious that the lever 10 can be moved from neutral past the intermediate positions $c$ and $e$ to $g'$, or stopped at either the positions $c$ or $e$.

The signalling apparatus shown in Figs. 9 to 18 inclusive is substantially like that shown in Figs. 1 to 8 inclusive except in the arrangement of the operating lever 110 and associated parts.

The lever 110 and means for mounting it are constructed especially for an open car, such as a truck or like vehicle.

The lever 110 is mounted on a hexagonal shaft 80 that has its ends rotatably mounted in the side wings 81, 82 of a bracket having its back plate 83 fitted to the side of the post 13 opposite to the housing 38 and secured thereto by the hollow bolt 52.

A crank arm 126 is secured on the shaft 80 at the end opposite to that on which the lever 110 is mounted, and a spring 76 under tension is arranged on the shaft between the arm and lever so that the detent 76 on the lever 110 is forced into one or the other of the recesses 72, 73, 74 and 75 in the sector plate 82 when in register. The hub of the lever is slidable on the hexagonal shaft 80 against the tension of the spring 76 to permit the detent 76 to escape from a recess when the lever is manually moved in an arc to actuate the signal arm 11.

In Fig. 17 I show a slight modification in the means for connecting the crank arm 126 with the pulley 39. This means includes a rod 85 having a threaded end adjustable through the swivel 86 by opposing nuts 87, 88. The other end of the rod 85 is connected by a closely coiled spring 90 to the pulley 39 over which it is extended and secured by a screw 91, the spring being strong enough to rotate the pulley in either direction to raise or lower the signal arm 11.

In Fig. 18 I show a double reflector 92 for throwing the light from the lamp 68 out on both sides of the hand 70 so it can be seen at night from both the front and rear of the car.

In operation the signal apparatus is actuated as described. The lever 10 in a closed car is moved to actuate the signal arm on the outside of the car to indicate an operator's intention to stop or turn the car to the left or right. It is obvious that the lever 110 when on an open car, such as a truck, can be so operated.

I claim as my invention:

1. The combination with a signal arm secured to a pulley pivotally mounted on the outside of a closed car, of a sleeve extended through the dash board of a closed automobile, a control lever on the inside of the automobile, a shank having one end integral with said lever and rotatably and slidably mounted in said sleeve so it extends from the inside to the outside of the automobile and beyond the outer end of said sleeve, and flexible means connecting the outer end of said shank with the pulley on which said signal arm is mounted, whereby said lever can be actuated by a driver to indicate his intentions to stop or turn right or left.

2. The combination with a signal arm having an end secured to a pulley pivotally mounted in a hollow semispherical split housing secured by a hollow bolt on the outside of a closed automobile, an electric lamp on the free end of said arm, means for lighting said lamp when said arm is moved to indicate a signal, said means including an electric wire extended through said hollow bolt of a control lever on the inside of the automobile having a shank rotatably and slidably mounted and extended from the inside to the outside of the car, an operative connection between the outer end of said shank and said signal arm whereby said lever can be actuated to move said arm to a signaling position, and releasable stop means at the inner end of said shank for the purpose specified.

3. The combination with a signal arm, a pulley to which said arm is secured that is pivotally connected to a hollow semispherical housing secured on the outside of an automobile, of a lever on the inside of the automobile having a disk with oppositely arranged detents adapted to fit in spaced recesses in a stationary disk, a sleeve integral with said stationary disk, a shank integral with the disk on said lever that is rotatably and slidably mounted in said sleeve, cranks secured to the outer end of said shank, a spring under tension on said shank arranged between said cranks and the outer end of said sleeve that is adapted to force the detents of said lever disk into the recesses of said stationary disk when they are in register, and a connection between said cranks and said pulley whereby said lever can be actuated to rotate said pulley and move said signal arm to a signaling position and whereby said detents will hold said lever and signal arm in predetermined positions until manually disengaged by a reverse movement of said lever.

In witness whereof, I have hereunto affixed my signature.

CHRISTOPHER C. HOLMES.